(No Model.)
G. HARKINS.
HOISTING JACK.
No. 316,777. Patented Apr. 28, 1885.
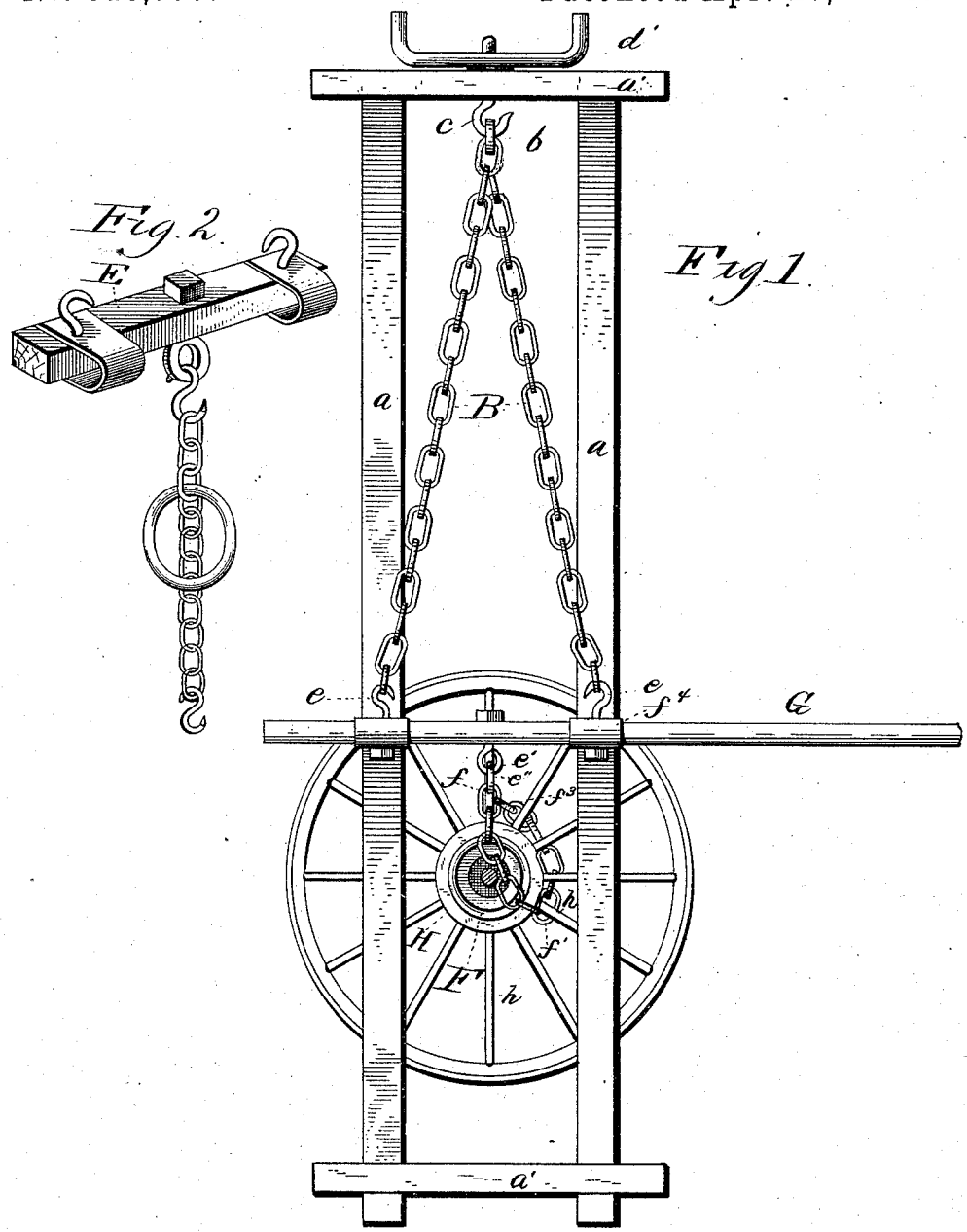
WITNESSES
INVENTOR

UNITED STATES PATENT OFFICE.

GEORGE HARKINS, OF ALEPPO, PENNSYLVANIA.

HOISTING-JACK.

SPECIFICATION forming part of Letters Patent No. 316,777, dated April 28, 1885.

Application filed March 17, 1885. (No model.)

*To all whom it may concern:*

Be it known that I, GEORGE HARKINS, of Aleppo, in the county of Green and State of Pennsylvania, have invented certain new and useful Improvements in Hoisting-Jacks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a hoisting-jack which is especially adapted to be employed in elevating, and supporting in its raised position while the same is in operation, the rear end of a thrashing-machine; and it consists, essentially, in the peculiar construction and combination of parts of a hoisting-jack having for its principal object to raise, level, and hold firmly in its elevated position the rear end of a thrashing-machine or similar object in such a manner as to completely remove all possibility of slipping or displacement of the hoisting-jack from the machine, as will be hereinafter fully described, and particularly pointed out in the claims.

Referring to the annexed drawings, Figure 1 represents a side elevation of my improved hoisting-jack, showing the same in its operative position; and Fig. 2 is a perspective detail view of the movable bar and the chains and ring suspended from the same which directly support the wheel of the thrashing-machine being operated upon.

Referring to the several parts by letter, A represents the main frame of the hoisting-jack, which may be of any desired height, but is preferably about six feet high, and is composed of the side pieces or uprights, $a$, and the upper and lower cross-pieces, $a'$ $a'$.

B B indicate the hoisting-chains, each of which is connected at its upper end to a ring, $b$, to adapt them to be conveniently placed in operative position upon a hook, $c$, the threaded straight portion of which passes up through a suitable vertical screw-threaded aperture, $a^2$, in the upper cross-bar of the frame A, and has placed upon its projecting end (which extends some distance above the upper face of the upper cross-bar) a nut, $d$, having the lever-extensions $d'$, by means of which it may be more readily turned for the purpose hereinafter specified.

E represents a short bar, of any suitable material, having near either end the hooks $e$ $e$, and provided at a point near its center with an eyebolt, $e'$, upon which a hook, $e^2$, is secured.

F indicates a metal ring of such a size as to adapt it to fit upon and around the exterior portion of a wheel-hub of ordinary construction, a short chain, $f$, connecting the said ring to the hook $e^2$ on the lower side of the bar E, while a second short chain, $f'$, is secured at one end, preferably to the chain $f$, near the ring F, and is provided at its free end with a hook, $f^3$, of such a size as to adapt it to engage with or fit into any one of the links of the chain $f'$.

G represents the operating-lever, one end of which is of such a size as to adapt it to fit within clips, $f^4$, secured upon the bar F near each of its extremities.

The operation of my improved hoisting-jack is as follows: When it is desired to raise the rear end of a thrashing-machine, the frame A is placed immediately opposite one of the rear wheels of the machine, in the position shown in Fig. 1 of the drawings, the bar E resting against the outside of the frame, when the ring F is passed between the side pieces of the frame to the opposite side thereof, where it is placed around or upon the outer extremity of the hub H, the chain $f^2$ being passed around one or more of the spokes $h$, and, after having been drawn tight, the hook upon its free end is caught in one of the links of the chain $f'$. One end of the operating-lever G is then inserted in the clips upon the bar E, one of the hooks, $e$, upon the upper side of the bar E being then inserted in one of the lower links of a chain, B, when the handle of the lever G is elevated so as to raise the wheel a short distance above the ground, when the disengaged hook $e$ of the bar is caught in one of the links of the other hoisting-chain, and so on alternately, and by thus successively raising the ends of the bar E a link at a time the wheel may be raised to any desired height above the ground. A second hoisting-jack is placed against the other rear wheel of the thrashing-machine when required, and is operated in a similar manner to elevate this wheel, thus raising the rear end of the machine above the ground to any desired height necessary to level the machine. Where it is desired to raise the bar E a distance less than the length of a link, the nut $d$ can be turned so as to slightly elevate the hook $c$ in the upper cross-bar, thus through the chains B elevating the bar E for any desired height less than the length of a link of the chains B. It will be seen that by placing the bar E upon the outside of the frame A, (which, as shown, is placed immediately upon the outside of the wheel of the machine which is being raised,) with the metal ring passing through the middle of the frame to its opposite side to engage with or be secured upon the wheel-hub, that when the wheel has been raised from the ground by the operations previously described, the weight of the machine operating most directly and at an angle upon the short chain $f$, and the bar E, from which this chain depends, will serve to hold the frame A more firmly against the side of the thrashing-machine, while the short chain $f'$, passing around the spokes of the wheel, serves to prevent the ring F from slipping or becoming disengaged from the wheel-hub, the weight of the machine as it is gradually raised serving to bind the chain more firmly around the spokes of the wheel and thereby effectually preventing the hook on the end of said chain from becoming disengaged.

It will be seen that by placing the ring F around the hub of the wheel and securing it firmly in position by the fastening-chain $f'$ it will be impossible for the hoisting-jack to become disengaged, this precaution being especially necessary in this case, as the vibrations of the thrashing-machine when in operation would tend to jar and displace the hoisting-jacks, were it not for the above-described device.

Having thus described my invention, what I claim as new, and desire to secure by Letters Patent, is—

1. The combination, in a hoisting-jack, of a suspended ring adapted to fit upon the outer end of a wheel-hub, and a fastening device for securing and holding the ring firmly in its operative position.

2. The combination, in a hoisting-jack, of a suspended ring adapted to fit upon the outer end of a wheel-hub, with a fastening chain secured at one end in proximity to the said ring and adapted to be passed around the spokes of the wheel and then secured by means of a hook on its free end in such a manner as to prevent the slipping or displacement of the ring from the wheel-hub, as set forth.

3. The combination, with a hoisting-jack constructed as described, and consisting of the frame A, hoisting-chains B, and bar E, having hooks $e\ e$, of a ring adapted to fit upon the outer end of a wheel-hub, and connected by a suitable chain to the said bar E, and a fastening-chain secured at one end in close proximity to the ring and adapted to be passed around the spokes of the wheel, and secured by means of a hook on its free end in such a manner as to prevent the displacement of the ring from the wheel-hub, substantially as described.

In testimony that I claim the foregoing as my own I affix my signature in presence of two witnesses.

GEORGE HARKINS.

Witnesses:
WILLIAM KING,
WILLIAM TEDROW.